: 2,755,315
Patented July 17, 1956

2,755,315
CRACKING ETHYLENE DICHLORIDE

Kenneth C. Eberly, Akron, Ohio, assignor to The Firestone Tire & Rubber Company, Akron, Ohio, a corporation of Ohio No Drawing. Application September 10, 1952,
Serial No. 308,943

3 Claims. (Cl. 260—656)

This invention relates to the thermal cracking of ethylene dichloride to produce vinyl chloride.

The thermal cracking of ethylene dichloride to produce vinyl chloride is prospectively a very economical process for the production of vinyl chloride, since the principal by-product, hydrogen chloride, can often be worked back into the process or used in some other related process. No disposal problem is presented, since no substantial amount of solid by-products are formed. However, the reactors employed in this process are necessarily of expensive construction since they must resist extremely corrosive conditions, and various catalysts have been proposed with a view to increasing the output per unit reactor volume in order to reduce costs. The only economic catalysts of this type so far proposed are gaseous oxygen, chlorine and bromine. All of these, however, greatly aggravate the corrosive conditions. Accordingly, there exists a need for novel, effective and economic catalysts for the thermal cracking of ethylene dichloride.

Ethylene dichloride, as commercially produced, frequently contains small percentages of chlorinated three-carbon compounds which have a strong inhibiting effect upon the cracking reaction. Particularly when such impure ethylene dichloride is used as the feed stock, it would be desirable to increase the rate of the cracking reaction.

It is therefore an object of this invention to provide a novel process for the cracking of ethylene dichloride to vinyl chloride, which process will have an increased output per unit of reactor space.

Another object is to provide a novel catalyst for the cracking of ethylene dichloride to vinyl chloride.

A further object is to provide such a catalyst which will accelerate the cracking of impure commercial ethylene dichlorides.

A further object is to provide such catalysts which will be economic and high effective, and which will not aggravate the corrosive conditions in the cracking apparatus.

SYNOPSIS OF THE INVENTION

The above and other objects of this invention are secured, in accordance with this invention, by incorporating from 0.5 to 5.0% of carbon tetrachloride into ethylene dichloride, and subjecting the mixture to the usual cracking temperatures of 400°–550° C. The percentages cited are on the basis of the weight of the ethylene dichloride in the mixture. The presence of the carbon tetrachloride greatly accelerates the rate of cracking of the ethylene dichloride, resulting in a very substantially increased yield of vinyl chloride for a given volume of reactor space. The presence of the carbon tetrachloride does not, so far as can be measured, aggravate the corrosive action of the gases in the reactor space. The carbon tetrachloride can readily be separated from the effluent gas by fractional condensation, distillation, adsorption or the like.

THE REACTION CONDITIONS

As above noted, the concentration of carbon tetrachloride should be from about 0.5 to 5.0%, based on the weight of ethylene dichloride. The lower limit represents the approximate concentration at which the addition of carbon tetrachloride begins to exert a worth-while catalytic effect, and the upper figure represents the approximate figure at which addition of further carbon tetrachloride begins to be wasteful due to asymtotic limitation of the improvement in yield, and to dilution effects.

The reaction conditions may be any customarily used in the art, typically with residence times of one to thirty seconds in the cracking zone, with temperatures in the range 400°–550° C. Longer residence times may of course be used, but will ordinarily be found wasteful of reactor space and also, in the extreme, may permit undesired side reactions to overtake the main desired reaction.

The carbon tetrachloride catalyst may be commingled with the ethylene dichloride at any point in its flow through the equipment. Conventionally, it may be mixed as a liquid with the ethylene dichloride before the latter is vaporized and injected into the reaction zone. Alternatively, it may be injected as a gas or a liquid into a stream of ethylene dichloride vapor being forwarded to a reaction zone, or may be injected into the reaction zone itself.

With the foregoing general discussion in mind, there are given herewith detailed examples showing specific modes of operation of this invention. All parts given are by weight.

Example I

| | Parts |
|---|---|
| Ethylene dichloride (reagent grade) | 100 |
| Carbon tetrachloride | 0, 0.5 or 1.0 |

Three runs were made in accordance with the foregoing schedule, one without carbon tetrachloride, one using a mixture containing 0.5 part and the other a mixture using 1.0 part of carbon tetrachloride. In each case, the selected composition at the rate of 1 ml. per minute of liquid, was vaporized in an evaporator, and the vapor passed through a straight 18–8 stainless steel tube having an inside diameter of 1.608 cm. which was freshly sandblasted on the interior, washed and dried before each run. The tube was heated at 475° C. for 61 cm. of its length, providing a residence time of about 6.5–6.9 seconds in the heated zone. The effluent gas was passed to a train comprising, in the following order, a trap maintained at 0° C. to condense the unconverted ethylene dichloride, a second trap maintained at −80° C. to condense the vinyl chloride product, and a packed tower in which the uncondensed gases were scrubbed by a countercurrent flow of water to absorb the hydrogen chloride. At the conclusion of the run, introduction of ethylene dichloride was discontinued and the scrubbings accumulated during the run were removed from the apparatus. The amount (A) of hydrogen chloride absorbed during the run was determined by titration of an aliquot portion of the scrubbings with 0.1 N sodium hydroxide to phenolphthalein neutrality.

After the conclusion of the run, the first trap was warmed slightly to boil any vinyl chloride and hydrogen chloride therein over into the second trap. The total contents of the second trap were then weighed and the weight (B) recorded, after which these contents in turn were permitted to boil slightly to drive off any hydrogen chloride dissolved therein. The hydrogen chloride so evolved was absorbed in the scrubber, and an aliquot of the scrubbings titrated with sodium hydroxide to determine the amount (C) of hydrogen chloride that had been retained by the traps. This amount (C) was added to the amount (A) of hydrogen chloride determined as having been absorbed by the scrubber during the cracking run, and the sum taken as the total of hydrogen chloride produced by cracking. This total is molecularly equivalent to the amount of vinyl chloride produced, and the percentage of ethylene dichloride converted to vinyl chloride was calculated on this basis and is recorded below in Table I. As an approximate check on the titration figures, the weight (B) of the contents of the second trap, minus the weight (C) of hydrogen chloride evolved therefrom, was used as the basis for calculating the percentage conversion. As will be seen from the table these values are slightly higher than the titration figures, and are considered less reliable due to weighing difficulties. Following are the results of the several runs.

TABLE I

|  | Parts of Carbon Tetrachloride Used per 100 Parts of Ethylene Dichloride | | |
| --- | --- | --- | --- |
|  | 0 | 0.5 | 1.0 |
| Percent of ethylene dichloride converted to vinyl chloride: | | | |
| Calculated from product recovered [1] | 68.0 | 80.7 | 83.5 |
| Calculated from HCl titration | 67.68 | 79.12 | 83.18 |
| Residence time of reacting gas in heated zone (seconds) | 6.936 | 6.688 | 6.587 |
| First order rate constant (sec. $^{-1}$) of the reaction: $ClCH_2CH_2Cl \longrightarrow CH_2=CHCl$ | 0.1619 | .2342 | .2702 |

[1] These figures are considered less reliable due to weighing difficulties, and the rate constant below is calculated on the basis of the HCl titration.

*Example II*

|  | Parts |
| --- | --- |
| Commercial ethylene dichoride (m. —37.8° C.; moisture 0.075%; $n_D^{20}$ 1.4449. Contains about 1.5–2.0% of chlorinated $C_3$ compounds. The product was derived from a petroleum source) | 100 |
| Carbon tetrachloride | 0, 0.5 or 1.0 |

The procedure of Example I was exactly repeated, using the commercial ethylene dichloride in place of the relatively pure ethylene dichloride of Example I. Following are the results obtained:

TABLE II

|  | Parts of Carbon Tetrachloride Used per 100 Parts of Ethylene Dichloride | | |
| --- | --- | --- | --- |
|  | 0 | 0.5 | 1.0 |
| Percent of ethylene dichloride converted to vinyl chloride: | | | |
| Calculated from product recovered | 28.0 | 30.6 | 36.0 |
| Calculated from HCl titration | 27.92 | 30.84 | 35.05 |
| Residence time of reacting gas in heated zone (seconds) | 8.123 | 8.026 | 7.910 |
| First order rate constant (sec. $^{-1}$) calculated on basis of HCl titration, for the reaction: $ClCH_2Cl \longrightarrow CH_2=CHCl$ | 0.0403 | 0.0459 | 0.0546 |

The operations above described were carried out continuously over extended periods of time, and no excessive corrosion of the equipment was observed.

From the foregoing general discussion and detailed specific examples, it will be evident that this invention provides a means for very substantially accelerating the thermal cracking of ethylene dichloride. The carbon tetrachloride employed as the catalyst is inexpensive and does not aggravate the corrosion problems in the cracking apparatus.

What is claimed is:

1. The process which comprises subjecting, to temperatures in the range 400° to 550° C. a mixture of ethylene dichloride and carbon tetrachloride containing from 0.5 to 5.0 per cent of carbon tetrachloride based on the weight of ethylene dichloride in the mixture.

2. The process which comprises subjecting, to a temperature of approximately 475° C., a mixture of ethylene dichloride and carbon tetrachloride containing approximately 0.5% of carbon tetrachloride, based on the weight of ethylene dichloride in the mixture.

3. The process which comprises subjecting, to a temperature of approximately 475° C. a mixture of ethylene dichloride and carbon tetrachloride containing approximately 1.0% of carbon tetrachloride, based on the weight of ethylene dichloride in the mixture.

References Cited in the file of this patent

UNITED STATES PATENTS

| 2,374,237 | Stanley et al. | Apr. 24, 1945 |
| 2,378,859 | Mugdan et al. | June 19, 1945 |
| 2,588,867 | Morris | Mar. 11, 1952 |